United States Patent
Tsai (10) Patent No.: US 10,383,026 B2
(45) Date of Patent: Aug. 13, 2019

(54) METHOD FOR SAVING POWER CONSUMPTION OF MOBILE STATION, AND MOBILE STATION, BASE STATION, AND ACCESS POINT

(71) Applicant: Industrial Technology Research Institute, Hsinchu (TW)

(72) Inventor: Tzu-Jane Tsai, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 143 days.

(21) Appl. No.: 15/459,001

(22) Filed: Mar. 15, 2017

(65) Prior Publication Data
US 2017/0272999 A1    Sep. 21, 2017

Related U.S. Application Data

(60) Provisional application No. 62/308,846, filed on Mar. 15, 2016.

(30) Foreign Application Priority Data

Mar. 8, 2017    (TW) .............................. 106107484 A (51) Int. Cl.
*H04W 40/00* (2009.01)
*H04W 52/02* (2009.01)
(Continued)

(52) U.S. Cl.
CPC ..... *H04W 40/005* (2013.01); *H04W 52/0219* (2013.01); *H04W 52/0235* (2013.01);
(Continued)

(58) Field of Classification Search
CPC .......... H04W 40/005; H04W 52/0219; H04W 52/0235; H04W 52/0274; H04W 52/08;
(Continued)

(56) References Cited

U.S. PATENT DOCUMENTS 8,908,584 B2    12/2014  Park et al.
9,504,032 B2    11/2016  Wang et al.
(Continued)

FOREIGN PATENT DOCUMENTS

CN    101411135    4/2009
CN    101616167    12/2009
(Continued)

OTHER PUBLICATIONS

LG Electronics Inc.,"DRX coordination in dual connectivity", 3GPP TSG-RAN2 Meeting #84, R2-134117, Nov. 11-15, 2013, pp. 1-2.
(Continued)

*Primary Examiner* — Hardikkumar D Patel
(74) *Attorney, Agent, or Firm* — JCIPRNET (57) ABSTRACT

The present disclosure relates to a method for saving power consumption of a mobile station, and a mobile station, a base station, and an access point using the method. A method embodiment applicable to the mobile station of according to the present disclosure, including: in response to receiving a control instruction through a first radio access technology, waking up, according to the control instruction, a communications module applying a second radio access technology; and subsequently, in response to in response to receiving an indication frame through the second radio access technology, controlling the communications module to enter a sleep mode.

32 Claims, 7 Drawing Sheets

(51) Int. Cl.
*H04W 52/08* (2009.01)
*H04W 52/14* (2009.01)

(52) U.S. Cl.
CPC ....... *H04W 52/0274* (2013.01); *H04W 52/08* (2013.01); *H04W 52/143* (2013.01); *Y02D 70/00* (2018.01); *Y02D 70/1262* (2018.01); *Y02D 70/1264* (2018.01); *Y02D 70/142* (2018.01); *Y02D 70/146* (2018.01); *Y02D 70/24* (2018.01)

(58) Field of Classification Search
CPC ............... H04W 52/143; H04W 48/16; H04W 52/0229; H04W 76/04; H04W 52/0232; H04W 76/28; H04W 24/08; H04W 72/0453; H04W 36/36; H04W 72/04; H04W 48/12; H04W 88/06; H04W 48/08; H04W 72/042; H04W 8/245; H04W 48/10; H04W 52/0216; H04W 52/0225; H04W 52/0222; H04W 68/025; H04W 74/00; H04W 28/02; H04W 56/00; H04W 56/001; H04W 76/16; H04W 16/14; H04W 28/0247; H04W 72/1215; H04W 76/15; H04W 88/10; H04W 88/16; Y02D 70/1264; Y02D 70/24; Y02D 70/142; Y02D 70/146; Y02D 70/00; Y02D 70/1262

See application file for complete search history.

(56) References Cited

U.S. PATENT DOCUMENTS

| | | | |
|---|---|---|---|
| 2012/0275366 A1* | 11/2012 | Anderson | H04W 52/0219 370/311 |
| 2014/0269633 A1* | 9/2014 | Behnamfar | H04L 5/0073 370/336 |
| 2014/0341038 A1 | 11/2014 | Lim | |
| 2015/0092573 A1* | 4/2015 | Zhang | H04W 24/10 370/252 |
| 2015/0098379 A1 | 4/2015 | Lunden et al. | |
| 2015/0139056 A1* | 5/2015 | Wang | H04W 48/08 370/311 |
| 2015/0181565 A1 | 6/2015 | Sirotkin et al. | |
| 2015/0195867 A1 | 7/2015 | Koc et al. | |
| 2015/0350988 A1 | 12/2015 | Himayat et al. | |
| 2015/0373674 A1 | 12/2015 | Han et al. | |
| 2016/0073297 A1 | 3/2016 | Hwang et al. | |
| 2016/0073338 A1 | 3/2016 | Kim et al. | |
| 2016/0135091 A1 | 5/2016 | Kwon et al. | |

FOREIGN PATENT DOCUMENTS

| | | |
|---|---|---|
| CN | 103430606 | 12/2013 |
| CN | 103491600 | 1/2014 |
| CN | 103582010 | 2/2014 |
| CN | 103987088 | 8/2014 |
| CN | 104144480 | 11/2014 |
| TW | 201044815 | 12/2010 |
| TW | 201249137 | 12/2012 |
| WO | 2014121508 | 8/2014 |

OTHER PUBLICATIONS

Huawei et al., "DRX coordination for UE with single RF receiver chain",3GPP TSG-RAN WG2 Meeting #84, R2-134280, Nov. 11-15, 2013, pp. 1-2.

Huawei et al.,"DRX coordination in dual connectivity",3GPP TSG-RAN WG2 Meeting #85, R2-140080, Feb. 10-14, 2014, pp. 1-3.

Qualcomm Incorporated, "Considerations on DRX procedure for LAA-LTE",3GPP TSG-RAN WG2 Meeting #91, R2-153840, Aug. 24-28, 2015, pp. 1-3.

Qualcomm Incorporated, "Considerations on DRX procedure for LAA-LTE", 3GPP TSG-RAN WG2 Meeting #91, R2-153860, Aug. 24-28, 2015, pp. 1-2.

IEEE Standards Association,"IEEE Standard for Information Technology—Telecommunications and information exchange between systems—Local and metropolitan area networks—Specific requirements—Part11:Wireless LAN Medium Access Control (MAC) and Physical Layer (PHY) specifications, Amendment 8: IEEE 802.11 Wireless Network Management", IEEE Std 802.11v™-2011, Feb. 9,2011, pp. 1-433.

IEEE Standards Association, "IEEE Standard for Information technology—Telecommunications and information exchange between systems—Local and metropolitan area networks—Specific requirements—Part 11: Wireless LAN Medium Access Control (MAC) and Physical Layer (PHY) specifications.", IEEE Std 8021 11™-2012, Mar. 29 ,2012, pp. 1-5229.

"Office Action of Taiwan Counterpart Application", dated Jan. 19, 2018, p. 1-p. 9, in which the listed references were cited.

Office Action of Taiwan Counterpart Application, dated Oct. 16, 2018, pp. 1-13.

"Office Action of China Counterpart Application," dated Apr. 30, 2019, p1-p22.

\* cited by examiner

METHOD FOR SAVING POWER CONSUMPTION OF MOBILE STATION, AND MOBILE STATION, BASE STATION, AND ACCESS POINT

CROSS-REFERENCE TO RELATED APPLICATION

This application claims the priority benefits of U.S. provisional application Ser. No. 62/308,846, filed on Mar. 15, 2016 and Taiwan application serial no. 106107484, filed on Mar. 8, 2017. The entirety of each of the above-mentioned patent applications is hereby incorporated by reference herein and made a part of this specification.

TECHNICAL FIELD

The present disclosure relates to a method for saving power consumption of a mobile station, and a mobile station, a base station, and an access point.

BACKGROUND

Based on different application requirements, the radio communications field develops various radio communications standards. Long Term Evolution (LTE) is a main technology of fourth generation (4G) mobile communications, and has advantages such as a large transmission range, high mobility, and high reliability. In another aspect, a Wireless Local Area Network (Wireless Local Area Network, WLAN) may be operated in an unlicensed spectrum without paying for a license fee of a frequency band. Therefore, costs for deployment and expansion may be effectively reduced, and the WLAN also becomes a much common communications network.

Figure 1:
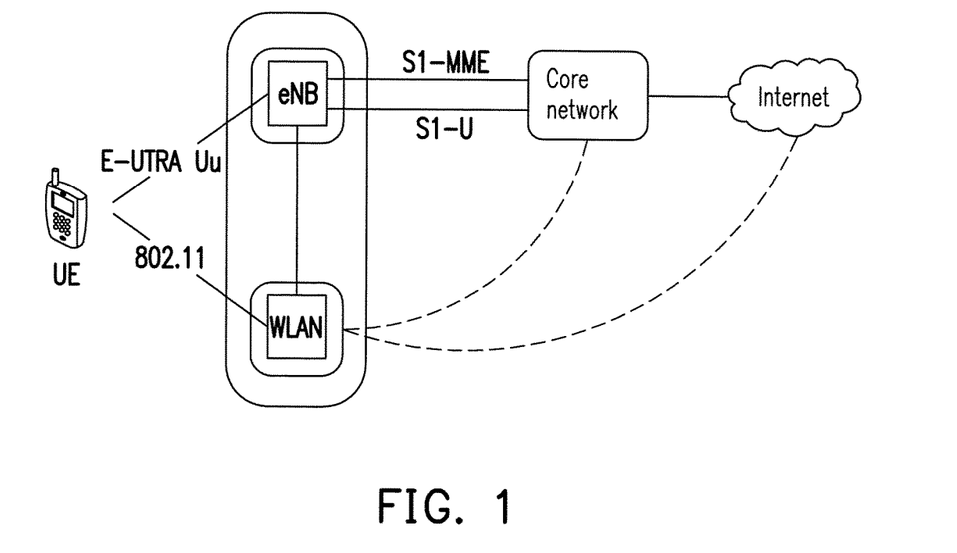
FIG. 1 is a schematic diagram illustrating LWA network architecture.

In order to satisfy requirements of a user for improving a transmission capacity of a communications system, the Third Generation Partnership Project (3GPP) brings in, in standards of the Long Term Evolution Advanced (LTE-A), technologies of Carrier Aggregation (CA) and Dual Connectivity (DC). The CA and DC technologies may transmit and receive data at the same time through a plurality of carriers, so that the communications system may achieve a higher transmission bandwidth. Under architecture of Downlink LTE-WLAN Aggregation (DL LWA), user equipment (User Equipment, UE) may use an LTE network and a WLAN network at the same time to receive downlink data. FIG. 1 is a schematic diagram illustrating LWA network architecture. Using FIG. 1 as an example, after the LWA technology is started to transmit data, an Evolved Node B (eNB or eNodeB) may offload, through a backhaul network, downlink data receiving from a core network to a WLAN access point. On this basis, while receiving a part of the transmitted data through a licensed spectrum from the eNB, the UE may also receive, through the unlicensed spectrum, transmission data of an offloaded portion from the WLAN access point.

Generally, in order to support the LWA network architecture, the UE needs to be installed with two communication chips which support an LTE communication protocol and the WLAN (for example: series IEEE 802.11), respectively. Running the two communication chips at the same time is easy to increase power consumption of the UE. Therefore, a set of energy-saving methods which may be applied to the UE applying the LWA technology needs to be developed.

SUMMARY

The present disclosure provides embodiments of a method for saving power consumption of a mobile station, and a mobile station, a base station, and an access point, providing a possible solution for saving power consumption of a mobile station using a LWA technology.

An embodiment of the present disclosure provides a method for saving power consumption of a mobile station applicable to a mobile station. The method includes: in response to receiving a control instruction through a first radio access technology, waking up, according to the control instruction, a communications module applying a second radio access technology; and in response to receiving an indication frame through the second radio access technology, controlling the communications module to enter a sleep mode.

An embodiment of the present disclosure provides a mobile station, including: a first communications module, and a second communications module. The first communications module applies a first radio access technology, and the second communications module applies a second radio access technology. In response to receiving a control instruction by the first communications module, the first communications module wakes up the second communications module according to the control instruction. Moreover, in response to receiving an indication frame by the second communications module, the second communications module enters a sleep mode.

An embodiment of the present disclosure provides a method for saving power consumption of a mobile station applicable to a base station applying the first radio access technology. The method includes: transmitting a control instruction to a mobile station, so as to wake up, according to the control instruction, a communications module applying a second radio access technology of the mobile station; and in response to receiving indication information from an access point applying the second radio access technology, determining that the communications module of the mobile station enters a sleep mode.

An embodiment of the present disclosure provides a base station applying a first radio access technology, including: a transceiver and a controller. The transceiver applies the first radio access technology, and is configured to transmit and receive a radio signal. The controller is coupled to the transceiver, and transmits a control instruction to a mobile station, so as to wake up, according to the control instruction, a communications module applying a second radio access technology of the mobile station, where the controller determines that the communications module of the mobile station enters a sleep mode in response to receiving indication information through the transceiver from an access point applying the second radio access technology.

An embodiment of the present disclosure provides a method for saving power consumption of a mobile station applicable to an access point applying the second radio access technology. The method includes: in response to determining that a transmission buffer corresponding to a mobile station is idle, transmitting an indication frame to the mobile station, so as to control a communications module applying the second radio access technology of the mobile station to enter a sleep mode; and transmitting indication information to a base station applying a first radio access technology, so as to notify the base station that the communications module of the mobile station enters the sleep mode.

In order to make the aforementioned features and advantages of the present disclosure more comprehensible, embodiments accompanied with figures are described in detail below.

DETAILED DESCRIPTION OF DISCLOSED EMBODIMENTS

In the content of the present disclosure, keywords or phrases similar to 3GPP are merely used as embodiments to represent concepts of the disclosure according to the content of the present disclosure. However, the same concepts represented in the content of the present disclosure may be applied to any other system by a person of ordinary skill in the art, for example: IEEE802.11, IEEE802.16, WiMAX, a sensor network, and other similar systems; this is not limited in the present disclosure.

In the content of the present disclosure, term "Physical Downlink Control. Channel (PDCCH)" is used to represent a control resource area or a downlink control channel indicating assignments and allocations of downlink (DL)/uplink (UL) resources. A same concept in the content of the present disclosure may also be applied to a downlink control channel including DL-MAP, UL-MAP, MBS-MAP, and the like through a simple analog; this is not limited in the present disclosure.

In the content of the present disclosure, nouns "base station" (Base Station, BS) and "access point" used herein may be, for example, an evolved nodeB, an advanced base station (ABS), a base transceiver system (BTS), a local base station, a relay station, a scatter, a repeater, an intermediate node, an intermediate and/or a satellite-based communication base station, a remote radio head (RRH), and other similar devices; this is not limited in the present disclosure.

In the content of the present disclosure, a noun "mobile station" used herein may be, for example, User Equipment (UE), an advanced mobile station (AMS), a server, a client, a desktop computer, a laptop computer, a network computer, a work station, a personal digital assistant (PDA), a personal computer (PC), a scanner, a telephone device, a beeper, a camera, a television, a handheld video game device, a music device, a radio sensor, a smartphone, and other similar devices. In some possible applications, the UE may also be a fixed computer device which is operated in an action environment such as a bus, a train, an aircraft, a boat, an automobile; this is not limited in the present disclosure.

In the field of wireless communications, UE having a LWA function becomes popular. Although using the LWA function may quicken a downloading speed of the UE by increasing a bandwidth, the UE needs to operate more components such as communication chips and antennas. As a result, power consumption of the UE is increased. Recently, the UE having the LWA function reduces a power consumption of an LTE communications module in the UE mainly by using a Discontinuous Reception (DRX) power-saving mechanism. The DRX mechanism allows the UE to periodically monitor a physical downlink control channel (PDCCH) when there are no requirements for a data transmission exist, so that the LTE communications module of the UE may turn off a radio frequency (RF) communications module at an interval period between two monitoring periods, so as to achieve power-saving effects. When using a DRX technology, the RF communications module periodically enters a sleep mode according to a DRX cycle. In order to further lower power consumption of the UE, the present disclosure provides a method for saving power consumption of a mobile station, and a mobile station, a base station, and an access point. Determining to turn on or off a WLAN communications module of the mobile station through sending instructions by the base station and the access point may enable the WLAN communications module of the mobile station to enter a sleep mode in a case in which data transmission is not performed, thereby saving power consumption of the mobile station.

Figure 2:
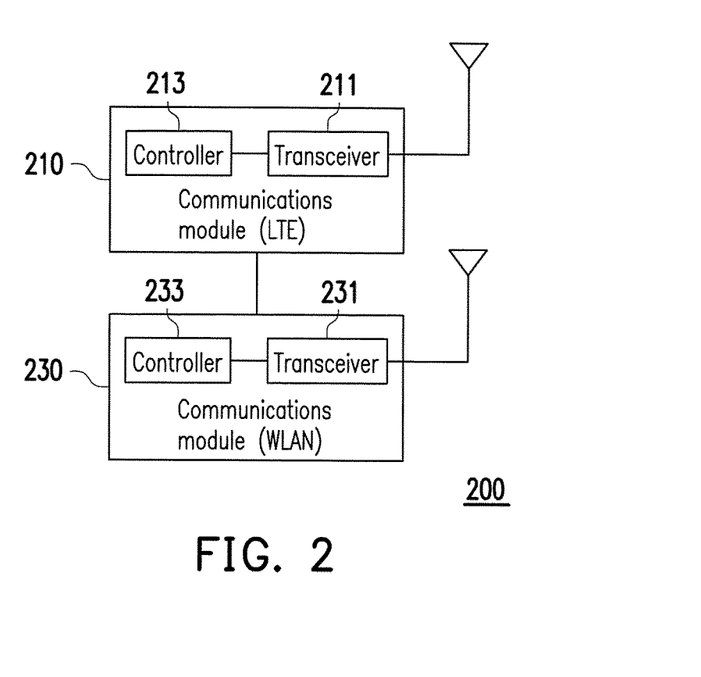
FIG. 2 illustrates a block diagram of a mobile station according to an embodiment of the present disclosure.

FIG. 2 illustrates a block diagram of a mobile station 200 according to an embodiment of the present disclosure. The mobile station 200 supports the LWA function, and may use a component carrier of an LTE network and a component carrier of a WLAN network at the same time to receive and transmit transmission data. The mobile station 200 includes an LTE communications module 210 and a WLAN communications module 230. The LTE communications module 210 may include a transceiver 211 and a controller 213, and applies, for example, an LTE radio access technology which may be applied to a licensed spectrum (for example: series 3GPP LTE and LTE-A). The transceiver 211 may include an antenna supporting an LTE frequency band, and may transmit and receive data through component carriers of the LTE network. The WLAN communications module 230 may include a transceiver 231 and a controller 233, and applies, for example, a WLAN radio access technology which may be applied to unlicensed spectra such as industrial, scientific, and medical (ISM) radio frequency bands or other free spectra (for example: the series IEEE 802.11). The transceiver 231 may include an antenna supporting the WLAN frequency band, and may transmit and receive transmission data through component carriers of the WLAN network. The transceiver 211 and the transceiver 231 may execute operations such as low-noise amplification, impedance matching, frequency mixing, frequency up-conversion or down-conversion, filtering, and amplification. For example, the transceiver 211 and the transceiver 231 may include an amplifier, a mixer, an oscillator, an analog-to-digital converter (ADC)/a digital-to-analog converter (DAC), and a filter. The ADC is configured to convert from an analog signal format into a digital signal format during an uplink signal processing period, and the DAC converts from the digital signal format into the analog signal format during a downlink signal processing period.

The controller 213 and the controller 233 may be optionally coupled to memory, so as to access a program code, device configuration, a codebook, and buffered or permanent data. Functions of the controller 213 and the controller 233 may be implemented by using programmable units such a microprocessor, a microcontroller, a digital signal processing (DSP) chip, and a field programmable gate array (FPGA).

Figure 3:
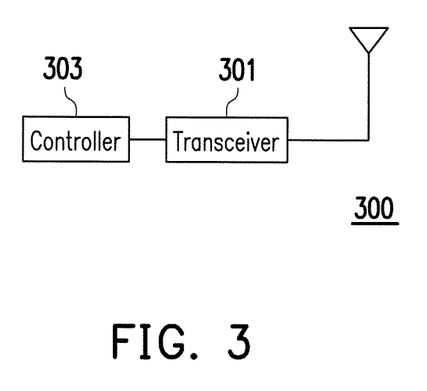
FIG. 3 illustrates a block diagram of a base station according to an embodiment of the present disclosure.

FIG. 3 illustrates a block diagram of a base station 300 according to an embodiment of the present disclosure. The base station 300 applies, for example, the LTE radio access technology which may be applied to the licensed spectrum (for example: series 3GPP LTE and LTE-A), and includes a transceiver 301 and a controller 303. The transceiver 301 applies the LTE radio access technology, and is configured to transmit and receive a radio signal through the component carrier of the LTE network. The controller 303 is coupled to the transceiver 301, and may transmit or receive a control signal or data through the transceiver 301. The transceiver 301 wirelessly transmits a downlink signal and receives an uplink signal. The transceiver 301 may also execute operations such as low-noise amplification, impedance matching, frequency mixing, frequency up-conversion or down-conversion, filtering, and amplification. The controller 303 may also be implemented by using hardware or software, and a function of each component of the base station 300 is similar to that of the base station 200. Therefore, detailed description of each component is not repeated.

Figure 4:
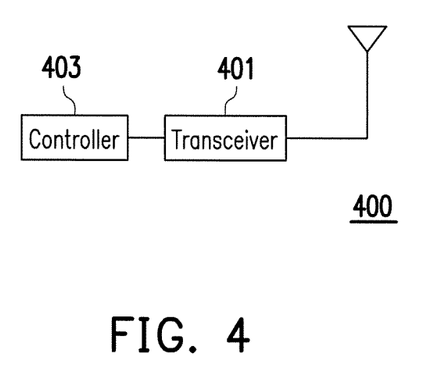
FIG. 4 illustrates a block diagram of an access point according to an embodiment of the present disclosure.

FIG. 4 illustrates a block diagram of an access point 400 according to an embodiment of the present disclosure. The access point 400 applies, for example, the WLAN radio access technology which may be applied to unlicensed spectra such as the ISM radio frequency bands or other free spectra (for example: the series IEEE 802.11), and includes a transceiver 401 and a controller 403. The transceiver 401 applies the WLAN radio access technology, and is configured to transmit and receive the radio signal through the component carrier of the WLAN network. The controller 403 is coupled to the transceiver 401, and may transmit or receive the control signal or data through the transceiver 401. The transceiver 403 may also execute operations such as low-noise amplification, impedance matching, frequency mixing, frequency up-conversion or down-conversion, filtering, and amplification. The controller 403 may also be implemented by using hardware or software, and a function of each component of the base station 300 is similar to that of the base station 200. Therefore, detailed description of each component is not repeated.

In order to save power consumption of the mobile station when applying a downlink LTE-WLAN aggregation (DL LWA) technology, an embodiment of the present disclosure provides a method of controlling the WLAN communications module of the UE (for example: the mobile station 200 of the present disclosure) by a network terminal (for example: a terminal at the base station 300 and a terminal at the access point 400 of the present disclosure). When the UE applies the DL LWA technology, through issuing a control instruction to the UE by the network terminal so as to notify the UE that whether the transmission data needs to be transmitted by a WLAN carrier, the UE may start or turn off the WLAN communications module according to the control instruction, thereby lowering unnecessary power consumption.

Figure 5:
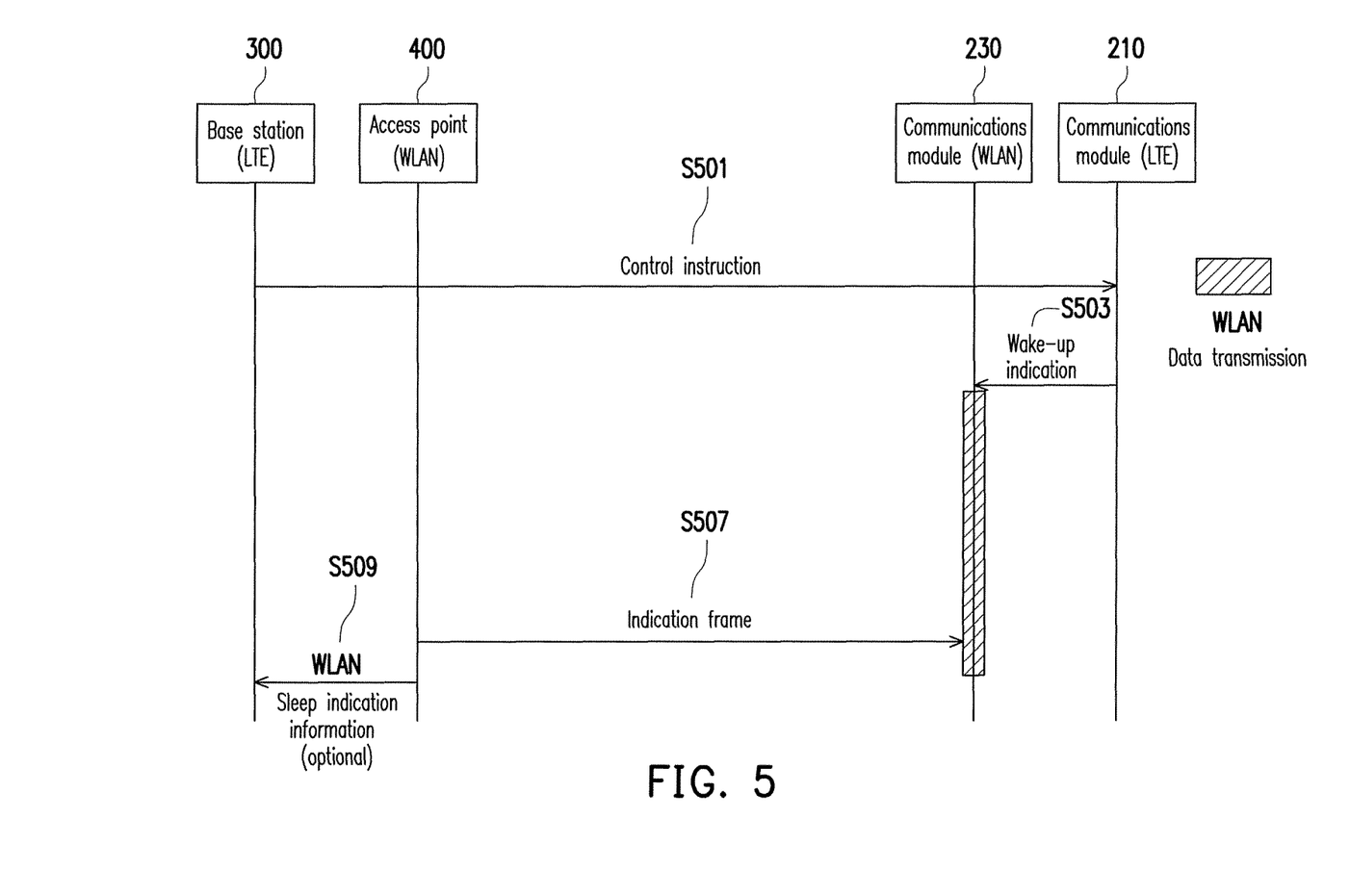
FIG. 5 illustrates a signal flowchart of a method for saving power consumption of a mobile station according to an embodiment of the present disclosure.

FIG. 5 illustrates a signal view of a method for saving power consumption of a mobile station according to an embodiment of the present disclosure. This signal flow may be applied to the mobile station 200, the base station 300, and the access point 400 disclosed in the present disclosure. In the present embodiment, the base station 300 may learn a function of the mobile station 200 that supports the LWA technology, for example, through information transmitted by the mobile station 200. Therefore, the method for saving power consumption of the mobile station which is disclosed in the present disclosure may be implemented. The information may be, for example, a preamble sent by the mobile station 200, which is not limited by the disclosure. In view of the mobile station 200, after the mobile station 200 receives the control instruction through the LTE network, in response to receiving the control instruction through the LTE network, the mobile station 200 may wake up, according to the control instruction, the WLAN communications module 230 applying a WLAN access technology in the mobile station 200. Subsequently, after the mobile station 200 receives an indication frame through the WLAN network, in response to receiving the indication frame through the WLAN network, the mobile station 200 may control the WLAN communications module 230 to enter the sleep mode. In view of the base station 300, the base station 300 may transmit the control instruction to the mobile station 200 through the controller 303, so as to wake up, according to the control instruction, the WLAN communications module 230 applying the WLAN access technology in the mobile station 200. The controller 303 determines that the WLAN communications module 230 of the mobile station 200 enters the sleep mode in response to receiving indication information through the transceiver 301 from the access point 400 applying the WLAN access technology. In view of the access point 400, in response to determining that a transmission buffer corresponding to the mobile station 200 is idle, the access point 400 may transfer, through the transceiver 401, the indication frame to the mobile station 200 by the controller 403, so as to control the WLAN communications module 230 applying the WLAN access technology of the mobile station 200 to enter the sleep mode. Subsequently, the controller 403 may transmit, through the transceiver 401, the indication information to the base station 300 applying an LTE access technology, so as to notify the base station 300 that the WLAN communications module 230 of the mobile station 200 enters the sleep mode.

In detail, in step S501, the base station 300 transmits the control instruction to the LTE communications module 210 in the mobile station 200 through the component carrier in the licensed spectrum of the LTE access technology. The control instruction may be transmitted by, for example, a control element (CE) in a Media Access Control (MAC) frame or a Radio Resource Control (RRC) message. For example, the MAC CE may be an MAC Control Element carried by the 3GPP TS 36.321 6.1.3, and the RRC message may be configured at an RRC connection-reconfiguration carried by the 3GPP TS 36.331. After the LTE communications module 210 receives the control signal, in step S503, the LTE communications module 210 sends out a wake-up indication to wake up the WLAN communications module 230, so that the WLAN communications module 230 start to perform a WLAN data transmission with the access point 400. The base station 300 may offload downlink data receiving from a core network to the access point 400, and the access point 400 temporarily saves the offloaded data in a buffer and transmits the offloaded data to the mobile station 200.

When the access point 400 determines that the transmission buffer thereof is idle, it indicates that data transmitting which needs to be performed through the access point 400 is completed. In response to determining that the transmission buffer is idle, in step S507, the controller 403 of the access point 400 may transmit the indication frame to the mobile station 200 through the transceiver 401, so as to control the WLAN communications module 230 applying the WLAN access technology of the mobile station 200 to enter the sleep mode. After transmitting the indication frame by the access point 400, the access point 400 may selectively execute step S509. In step S509, the controller 401 of the access point 400 may transfer, through the transceiver 403, the indication information to the base station 300 applying the LTE access technology, so as to notify the base station 300 that the WLAN communications module 230 of the mobile station 200 enters the sleep mode.

Figure 6:
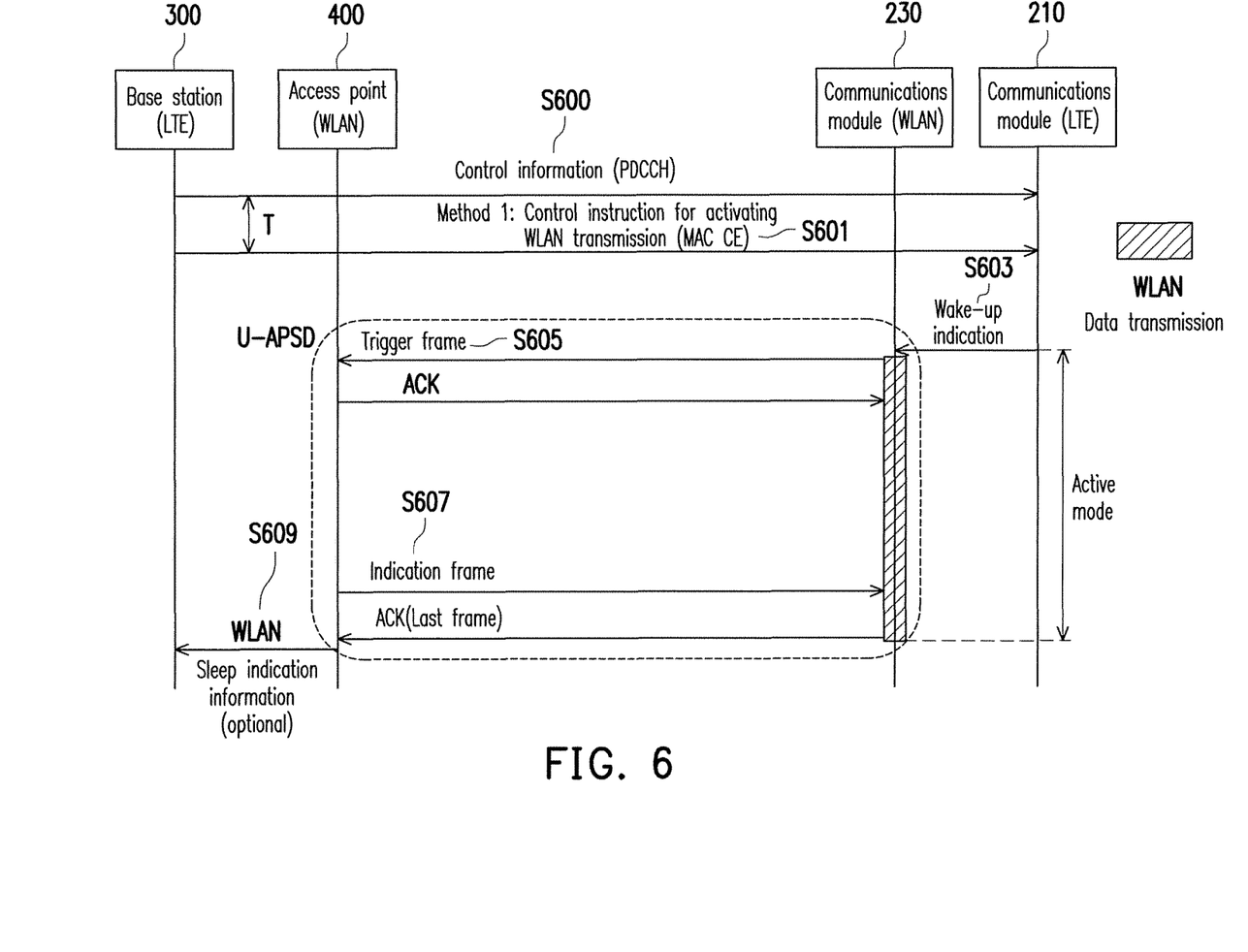
FIG. 6 illustrates a signal flowchart of a method for saving power consumption of a mobile station according to another embodiment of the present disclosure.

FIG. 6 illustrates a signal flowchart of a method for saving power consumption of a mobile station according to another embodiment of the present disclosure. This signal flow may be applied to the mobile station 200, the base station 300, and the access point 400 disclosed in the present disclosure. In step S600, the controller 303 of the base station 300 sends, through the transceiver 301, control information by using a PDCCH in the licensed spectrum of the LTE access technology, so as to notify the mobile station 200 to obtain the control instruction from a corresponding resource block (RB) according to the control information, where the control information may include downlink control information (DCI). After the LTE communications module 210 of the mobile station 200 receives the control information through the PDCCH in the licensed spectrum, the LTE communications module 210 obtains, from the control information, a position of a corresponding RB of the control instruction. In step S601, the LTE communications module 210 may obtain the control instruction according to the control information (for example, through the RB position in the control information). The control instruction may be configured in the MAC CE, and the MAC CE may be, for example, an MAC CE carried by the 3GPP TS 36.321 6.1.3.

In step S603, the LTE communications module 210 sends out the wake-up indication to wake up the WLAN communications module 230, so that the WLAN communications module 230 starts performing a WLAN data transmission with the access point 400. The base station 300 may offload the downlink data receiving from the core network to the access point 400. The access point 400 temporarily saves the offloaded data in the transmission buffer and transmits the offloaded data to the mobile station 200. When the access point 400 determines that the transmission buffer is idle, it indicates that data transmitting which needs to be performed through the access point 400 is completed. In response to determining that the transmission buffer is idle, in step S607, the controller 403 of the access point 400 transmits the indication frame to the mobile station 200 through the transceiver 401, so as to control the WLAN communications module 230 applying the WLAN access technology of the mobile station 200 to enter the sleep mode. The foregoing indication frame may be, for example, a frame of which a flag "more data" in a frame control field is 0. After transmitting the indication frame, the access point 400 may selectively execute step S609. In step S609, the controller 401 of the access point 400 may transfer, through the transceiver 403, the indication information to the base station 300 applying the LTE access technology, so as to notify the base station 300 that the WLAN communications module 230 of the mobile station 200 enters the sleep mode. In the present embodiment, through executing step S609, when the WLAN communications module 230 of the mobile station 200 does not enter the sleep mode, the base station 300 may be configured to stop sending the MAC CE. In this way, the base station 300 may be avoided to send an unnecessary control signal MAC CE in order to wake up the mobile station 200 which does not enter the sleep mode.

In another implementation aspect of the embodiment of FIG. 6, the WLAN communications module 230 of the mobile station 200 and the access point 400 may perform a conversion from the sleep mode to an active mode by using a technology similar to the unscheduled automatic power save delivery (U-APSD). Specifically, after the LTE communications module 210 transmits the wake-up indication to wake up the WLAN communications module 230 in step S603, the WLAN communications module 230 enters the active mode. Subsequently, in step S605, the WLAN communications module 230 transmits a trigger frame to the access point 400 by using the WLAN access technology, so as to trigger the access point 400 to activate the WLAN data transmission with the WLAN communications module 230. When the access point 400 determines that an internal transmission buffer thereof is idle, in step S607, the controller 403 of the access point 400 transmits the indication frame to the mobile station 200 through the transceiver 401, so as to control the WLAN communications module 230 applying the WLAN access technology of the mobile station 200 to enter the sleep mode.

In another implementation aspect of the embodiment of FIG. 6, a solution applicable to a no ideal backhaul network is further provided. When the base station 300 and the access point 400 employ a link manner of a non-ideal backhaul network, a transmission delay exists between the base station 300 and the access point 400. The transmission delay makes the base station 300 unable to transmit WLAN transmission data to be offloaded to the access point 400 to the access point 400 in time. Therefore, after the base station 300 sends the control instruction to the mobile station 200, it is possible that the access point 400 may not be ready for performing the data transmission with the WLAN communications module 230. However, at this time, if the LTE communications module 210 wakes up the WLAN communications module 230 according to the control instruction, the WLAN communications module 230 is unable to receive the WLAN transmission data transmitted by the access point 400 at an initial stage after being activated, resulting in a power waster of the mobile station 200.

In order to resolve the foregoing transmission delay problem of the non-ideal backhaul network, in the present embodiment, after the base station 300 sends the control information to the LTE communications module 210 of the mobile station 200, the base station 300 may delay, on the basis of the transmission delay between the base station 300 and the access point 400, a time for sending the control instruction by a transmission delay time T, where length of the transmission delay time T may be set according to the transmission delay between the base station 300 and the access point 400. In other words, supposing that a subframe having the control information is sent by the base station 300 at a time point T1, the base station 300 may configure the control instruction in a subframe sent at a time point T2, where the time point T2 equals to a value obtained by adding the time point T1 and the transmission delay time T (T2=T1+T). Through delaying transmitting the control instruction from the base station 300, the LTE communications module 210 may wake up the WLAN communications module 230 from the sleep state after the access point 400 is ready to perform the WLAN data transmission. In this way, the power consumption of the mobile station 200 is lowered. In another aspect, if the base station 300 and the access point 400 use a link manner of an ideal backhaul network, because the transmission delay between the base station 300 and the access point 400 may be ignored, the base station 300 do not need to delay a time for sending the control instruction. For example, the base station 300 may send the control information and the control instruction in a same subframe.

Figure 7:
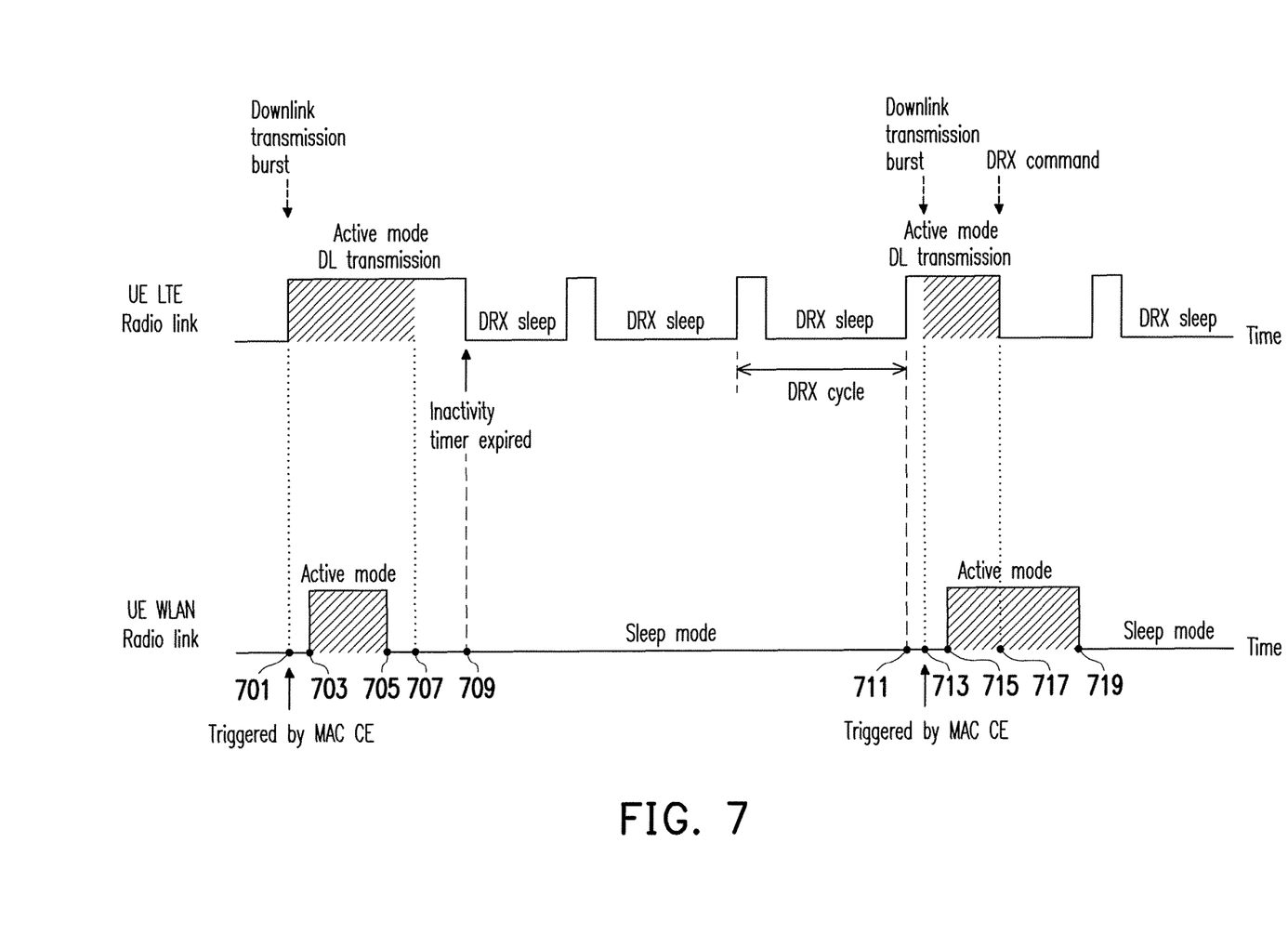
FIG. 7 illustrates a timing flowchart of a method for saving power consumption of a mobile station according to an embodiment of FIG. 6 of the present disclosure.

FIG. 7 illustrates a timing flowchart of a method for saving power consumption of a mobile station according to an embodiment of FIG. 6 of the present disclosure. FIG. 7 may show two conditions which may occur when executing the embodiment of FIG. 6 of the present disclosure. When the mobile station 200 uses the LWA technology to receive data by the LTE network and the WLAN network at the same time, an end time of the WLAN data transmission may be earlier or later than an end time of the LTE data transmission. FIG. 7 describes the foregoing different cases.

Please refer to FIG. 7. A case in which an end time of the WLAN transmission is earlier than an end time of the LTE transmission is first described by using a time interval from a time point 701 to a time point 709 as an example. When the base station 300 decides to use the LWA technology and start to transmit a DL transmission burst to the mobile station 200, at the time point 701, the LTE communications module 210 of the mobile station 200 starts to perform the LTE data transmission with the base station 300 through the component carrier in the licensed spectrum of the LTE access technology. Moreover, since the base station 300 is going to use the LWA technology to transmit the data to the mobile station 200, the base station 300 transmits, through the MAC CE, the control instruction to the LTE communications module 210 of the mobile station 200 by using the LTE access technology. In another aspect, after the LTE communications module 210 of the mobile station 200 receives the control instruction, the LTE communications module 210 transmits, directly or indirectly by using another control unit in the mobile station 200, the wake-up indication to the WLAN communications module 230, so as to wake up the WLAN communications module 230.

After the WLAN communications module 230 is woken up at the time point 703, the WLAN communications module 230 starts to perform the WLAN data transmission with the access point 400 through the component carrier in the unlicensed spectrum of the WLAN access technology. At a time point 705, offloaded data offloaded to the access point 400 is completely transmitted, and the WLAN communications module 230 completes the WLAN data transmission with the access point 400. As shown in step S607 of FIG. 6, the access point 400 transmits the indication frame when the WLAN data transmission is completed, so as to control the WLAN communications module 230 of the mobile station 200 to enter the sleep mode. Subsequently, at a time point 707, the LTE communications module 210 completes the LTE data transmission with the base station 300. In a case in which the LTE communications module 210 does not receive a DRX command actively sent by the base station 300, the LTE communications module 210 of the mobile station 200 does not enter a DRX sleep mode when the data transmission is completed, but determines whether to enter the DRX sleep mode according to an inactivity timer in DRX parameters. When the mobile station 200 finds that there is no data to receive through monitoring the PDCCH, the inactivity timer starts timing, and when time of the inactivity timer is expired, the LTE communications module 210 enters the DRX sleep mode. For example, as shown in FIG. 7, the mobile station 200 finds that there is no data to receive at the time point 707, and the inactivity timer is started to time. When a time point 709 is reached, the time of the inactivity timer is expired. Therefore, the LTE communications module 210 enters the DRX sleep mode.

Please refer to FIG. 7 again. Subsequently, an application case in which the end time of the WLAN transmission is later than the end time of the LTE transmission is described by using a time interval from a time point 711 to a time point 719 as an example. At the time point 711, a DRX sleep time ends, and the LTE communications module 210 enters to the active mode to monitor the PDCCH and determine whether the data transmission is required. When the base station 300 starts to transmit the DL transmission burst to the mobile station 200 at a time point 713, the LTE communications module 210 of the mobile station 200 may start to perform the LTE data transmission with the base station 300 through the component carrier in the licensed spectrum of the LTE access technology. Moreover, the base station 300 may transfer, through the MAC CE, the control instruction to the LTE communications module 210 of the mobile station 200 by using the LTE access technology. In another aspect, after the LTE communications module 210 of the mobile station 200 receives the control instruction, the LTE communications module 210 transmits the wake-up indication to the WLAN communications module 230, so as to wake up the WLAN communications module 230.

After the WLAN communications module 230 is woken up, at a time point 715, the WLAN communications module 230 may start to perform the WLAN data transmission with the access point 400 through the component carrier in the unlicensed spectrum of the WLAN access technology. At a time point 717, the LTE communications module 210 completes the LTE data transmission with the base station 300. The base station 300 may transmit the DRX command to the LTE communications module 210 when the LTE data transmission is completed, so as to control, according to the DRX command, the LTE communications module 210 to enter the sleep mode.

Subsequently, the WLAN communications module 230 continues to perform the WLAN data transmission with the access point 400 until to a time point 719. At the time point 719, as shown in step S607 of FIG. 6, the access point 400 transmits the indication frame when the WLAN data transmission is completed, so as to control the WLAN communications module 230 of the mobile station 200 to enter the sleep mode.

It should be noted that on the basis of the implementation of the step S609 in FIG. 6, the base station 300 may determine whether the mobile station 200 enters the sleep mode. In other words, if the base station 300 does not receive sleep indication information after sending the control instruction, the base station 300 considers that the WLAN communications module 230 of the mobile station 200 is also operated in the active mode. If the base station 300 receives the sleep indication information after sending the control instruction, the base station 300 considers that the WLAN communications module 230 of the mobile station 200 is switched to operate in the sleep mode. On this basis, in the case in which the end time of the WLAN transmission is later than the end time of the LTE transmission (the time interval from the time point 711 to the time point 719), the base station 300 may send the DRX command to the LTE communications module 210 under a condition of determining, because the sleep indication information sent by the access point 400 is not received, that the WLAN communications module 230 is still operated in the active mode, and in response to that the LTE data transmission is completed at the time point 715. Therefore, the LTE communications module 210 may need not to enter the DRX sleep mode only after the WLAN communications module 230 completes the WLAN data transmission, thereby further improving an efficiency of saving the power of a DRX power-saving mechanism.

Figure 8:
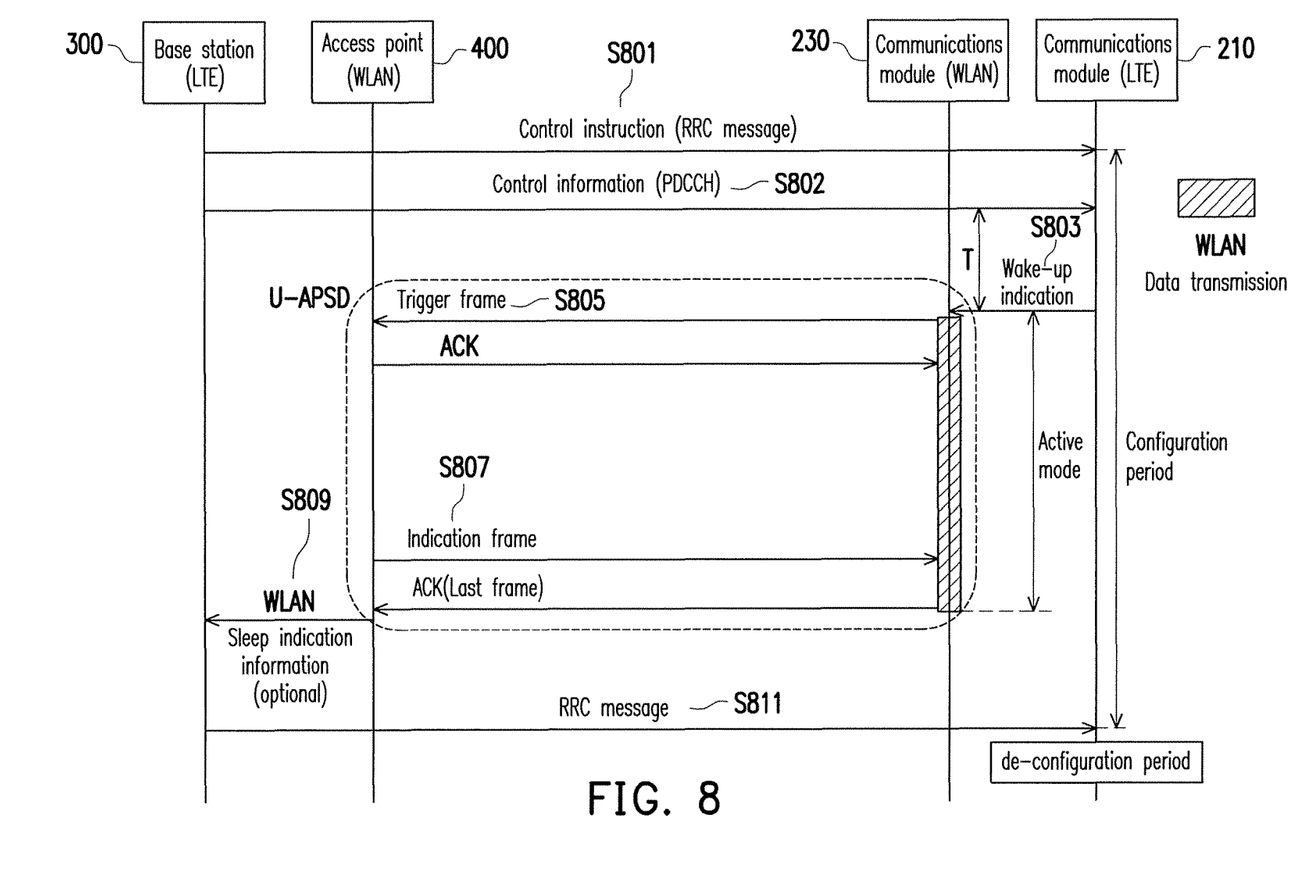
FIG. 8 illustrates a signal flowchart of a method for saving power consumption of a mobile station according to another embodiment of the present disclosure.

FIG. 8 illustrates a signal flowchart of a method for saving power consumption of a mobile station according to another embodiment of the present disclosure. This signal flow may be applied to the mobile station 200, the base station 300, and the access point 400 disclosed in the present disclosure. At step S801, the controller 303 of the base station 300 transmits, through the transceiver 301, the control instruction to the mobile station 200, so as to control the mobile station 200 to enter a configuration period, where the control instruction may be configured in RRC message of the RRC connection-reconfiguration (for example: the RRC connection-reconfiguration carried by the 3GPP TS 36.331). After the mobile station 200 receives the control instruction, the LTE communications module 210 enters the configuration period. If the LTE communications module 210 receives control information which may be, for example, the DCI during the configuration period, the LTE communications module 210 sends out the wake-up indication to wake up the WLAN communications module 230. In detail, in step S802, the base station 300 transmits, through the controller 303, the control information by using the PDCCH in the licensed spectrum of the LTE access technology during the configuration period, so as wake up the WLAN communications module 230 of the mobile station 200.

Subsequently, in step S803, in response to that the LTE communications module 210 receives the control information during the configuration period, the LTE communications module 210 sends out the wake-up indication, so as to wake up the WLAN communications module 230, so that the WLAN communications module 230 starts to perform the WLAN data transmission with the access point 400. The base station 300 may offload the downlink data from the core network to the access point 400, and the access point 400 may temporarily save the offloaded data in the transmission buffer and transmit the data in the transmission buffer to the mobile station 200. When the access point 400 determines that the transmission buffer is idle, it indicates that data transmitting which is performed through the access point 400 is completed. In response to determining that the transmission buffer is idle, in step S807, the controller 403 of the access point 400 transmits the indication frame to the mobile station 200 through the transceiver 401, so as to control the WLAN communications module 230 applying the WLAN access technology of the mobile station 200 to enter the sleep mode. After transmitting the indication frame by the access point 400, the access point 400 may selectively execute step S809. In step S809, the controller 401 of the access point 400 may transfer, through the transceiver 403, the indication information to the base station 300 applying the LTE access technology, so as to notify the base station 300 that the WLAN communications module 230 of the mobile station 200 enters the sleep mode. Subsequently, at step S811, the base station 300 transmits another RRC message, so as to terminate the configuration period of the LTE communications module 210. Using the control information being the DCI as an example, after leaving the configuration period, the LTE communications module 210 would not send out the wake-up indication to wake up the WLAN communications module 230 even though DCI which is from the base station 300 and is related to the LTE communications module 210 is received.

The embodiment of FIG. 8 mainly configures the mobile station 200 through the RRC message by using the base station 300, so as to control the LTE communications module 210 of the mobile station 200 to enter the configuration period, so that the LTE communications module 210 may receive the DCI from the base station 300 during the configuration period, so as to wake up the WLAN communications module 230. However, in another embodiment of the present disclosure, the base station 300 may further configure, through the RRC message, the mobile station 200 as a semi-persistence scheduling (SPS) configuration. At the SPS configuration, the mobile station 200 may periodically start the WLAN communications module 230 till the end of the SPS configuration or the base station 300 sends RRC message for stopping the configuration period.

It should be noted that loading dedicated to the LTE bearing or LWA bearing may coexist among the mobile station 200, the base station 300, and the access point 400. For example, if the mobile station 200 and the base station 300 only needs to receive the transmission data though the LTE dedicated bearing, the mobile station 200 only needs to start the LTE communications module 210. On the contrary, if the mobile station 200 and the base station 300 needs to receive the transmission data though the LTE dedicated bearing and the LWA bearing at the same time, the mobile station 200 needs to activate the LTE communications module 210 and the WLAN communications module 230 at the same time. Based on the above, if the mobile station 200 can learn a bearing type which is possibly used by the base station 300 when performing the data transmission, the mobile station 200 may determine whether the WLAN communications module 230 needs to be woken up. Therefore, in another embodiment of the present disclosure, the DCI may include a bit for indicating whether the mobile station 200 uses the WLAN communications module 230 to perform the WLAN data transmission. In this way, the LTE communications module 210 may determine, according to the bit, whether to wake up the WLAN communications module 230.

In another implementation aspect of FIG. 8, the mobile station 200 and the access point 400 may perform the data transmission through a technology of U-APSD. Specifically, after the LTE communications module 210 transmits the wake-up indication to wake up the WLAN communications module 230, the WLAN communications module 230 enters the active mode. Subsequently, in step S805, the WLAN communications module 230 transmits the trigger frame to the access point 400 by using the WLAN access technology, so as to trigger the access point 400 to start the WLAN data transmission with the WLAN communications module 230. When the access point 400 determines that the internal transmission buffer thereof is idle, in step S807, the controller 403 of the access point 400 transmits the indication frame to the mobile station 200 through the transceiver 401, so as to control the WLAN communications module 230 applying the WLAN access technology of the mobile station 200 to enter the sleep mode.

In another implementation aspect of the embodiment of FIG. 8, a solution applicable to a non-ideal backhaul network is further provided. In the present embodiment, the base station 300 sends the control information to the LTE communications module 210 of the mobile station 200. In response to that the LTE communications module 210 receives the control information, the LTE communications module 210 sends out the wake-up indication after a transmission delay time T, where the length of the transmission delay time T may be set according to the transmission delay between the base station 300 and the access point 400. For example, the base station 300 may transmit, on the basis of the transmission delay between the base station 300 and the access point 400, a parameter related to the transmission delay through, for example, RRC message in RRC reconfiguration. Therefore, the mobile station 200 may set the transmission delay time T for delaying before sending the wake-up indication according to the parameter. Through delaying transmitting the wake-up indication by the transmission delay time T, the LTE communications module 210 may wake up the WLAN communications module 230 from the sleep state only after the access point 400 is ready for performing the WLAN data transmission, so as lower the power consumption of the WLAN communications module 230.

Figure 9:
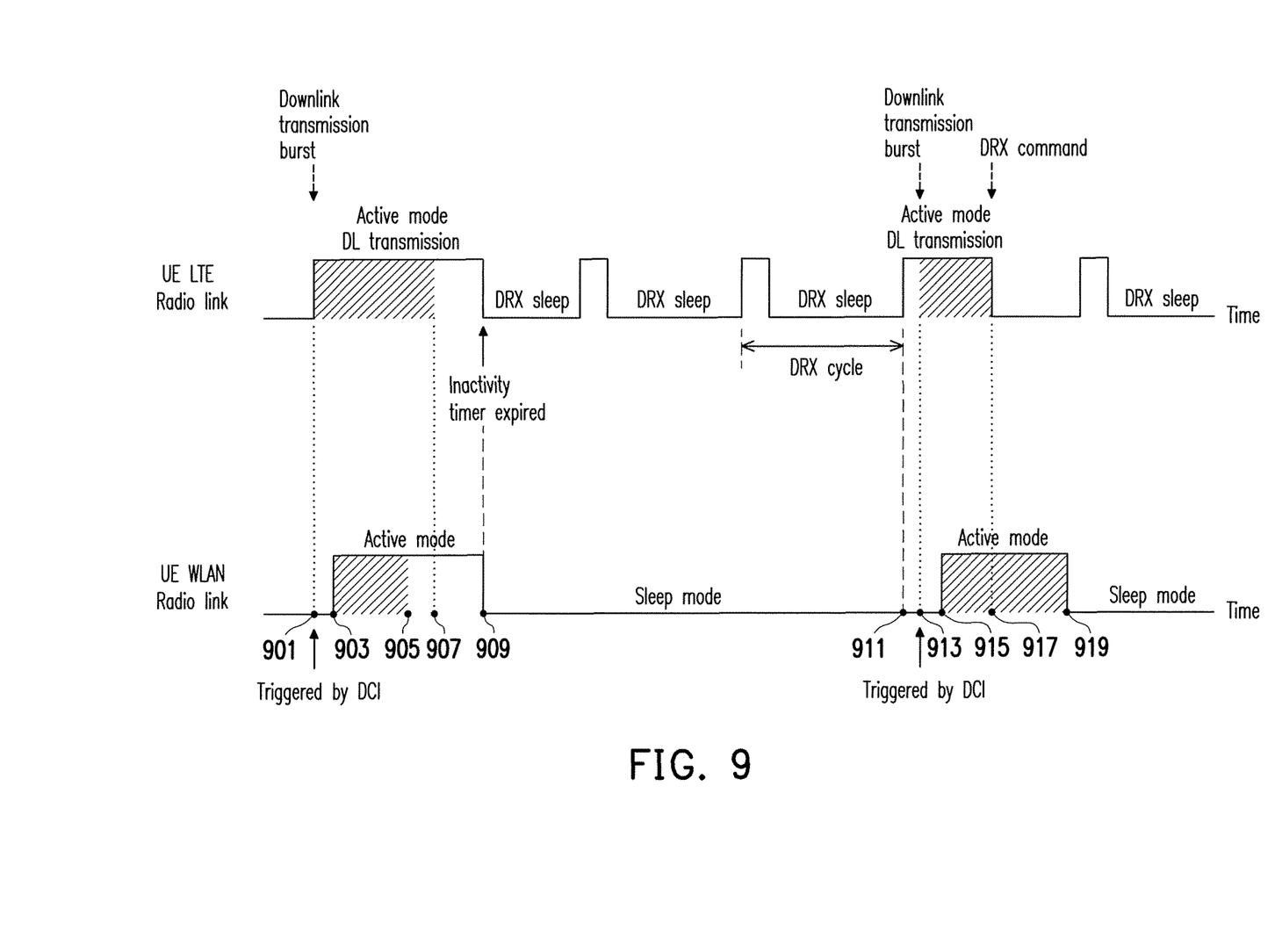
FIG. 9 illustrates a timing flowchart of a method for saving power consumption of a mobile station according to an embodiment of FIG. 8 of the present disclosure.

FIG. 9 illustrates a timing flowchart of a method for saving power consumption of a mobile station according to an embodiment of FIG. 8 of the present disclosure. FIG. 9 may show two conditions which may occur when executing the embodiment of FIG. 8 of the present disclosure. When the mobile station 200 uses the LWA technology to receive the data by the LTE network and the WLAN network at the same time, the end time of the WLAN data transmission may be earlier or later than the end time of the LTE data transmission. FIG. 9 describes the foregoing different cases.

A case in which the end time of the WLAN transmission is earlier than the end time of the LTE transmission is first described by using a time interval from a time point 901 to a time point 909 as an example. When the base station 300 decides to use the LWA technology and start to transmit the DL transmission burst to the mobile station 200, the base station 300 may transmit the control instruction to the LTE communications module 210 of the mobile station 200 through the RRC message previously by using the LTE access technology, so that the LTE communications module 210 enters the configuration period. At the time point 901, the base station 300 transmits the control information to the LTE communications module 210 of the mobile station 200 through the component carrier in the licensed spectrum of the LTE access technology. In another aspect, after the LTE communications module 210 of the mobile station 200 receives the control information during the configuration period, the LTE communications module 210 transmits, directly or indirectly by using another control unit in the mobile station 200, the wake-up indication to the WLAN communications module 230, so as to wake up the WLAN communications module 230.

After the WLAN communications module 230 is woken up at the time point 903, the WLAN communications module 230 starts to perform the WLAN data transmission with the access point 400 through the component carrier in the unlicensed spectrum of the WLAN access technology. At the time point 905, offloaded data offloaded to the access point 400 is completely transmitted, and the WLAN communications module 230 completes the WLAN data transmission with the access point 400. As shown in step S807 of FIG. 8, the access point 400 transmits the indication frame when the WLAN data transmission is completed, so as to control the WLAN communications module 230 of the mobile station 200 to enter the sleep mode. At the time point 907, the LTE communications module 210 completes the LTE data transmission with the base station 300. In a case in which the LTE communications module 210 does not receive the DRX command actively sent by the base station 300, the LTE communications module 210 of the mobile station 200 does not enter the DRX sleep mode even though the data transmission is completed, but determines, according to the inactivity timer in the DRX parameters, a time point for turning off LTE communications module 210. When the mobile station 200 finds that there is no data to receive through monitoring the PDCCH, the inactivity timer starts timing, and when the time of the inactivity timer is expired, the LTE communications module 210 enters the DRX sleep mode.

It should be noted that the base station 300 in the present embodiment wakes up the WLAN communications module 230 of the mobile station 200 through, for example, the DCI. In a case in which the end time of the WLAN transmission is earlier than the end time of the LTE transmission, the LTE communications module 210 may still continuously receive the DCI from the base station 300 after the WLAN communications module 230 completes the WLAN data transmission, so that the LTE communications module 210 continuously transmits the wake-up indication to the WLAN communications module 230, so as to continuously switch the WLAN communications module 230 between the active mode and the sleep mode. In order to avoid the foregoing problems, in the embodiments of FIG. 8 and FIG. 9, the WLAN communications module 230 enters the sleep mode in a case in which the indication frame from the access point 400 is received and the LTE communications module 210 completes the LTE data transmission. As shown in FIG. 9, at the time point 905, the WLAN communications module 230 completes the WLAN data transmission with the access point 400. However, the WLAN communications module 230 enters the sleep mode at the time point 909 only when the LTE communications module 210 completes the LTE data transmission.

Please refer to FIG. 9 again. Subsequently, an application case in which the end time of the WLAN transmission is later than the end time of the LTE transmission is described by using a time interval from a time point 911 to a time point 919 as an example. At the time point 911, the DRX sleep time ends, and the LTE communications module 210 enters the active mode to monitor the PDCCH and determine whether the data transmission is required. When the base station 300 starts to transmit the DL transmission burst to the mobile station 200 at the time point 913, the base station 300 transmits, through the PDCCH, the control information (DCI) to the LTE communications module 210 of the mobile station 200 by using the LTE access technology. In another aspect, after the LTE communications module 210 of the mobile station 200 receives the control information (DCI), the LTE communications module 210 transmits the wake-up indication to the WLAN communications module 230, so as to wake up the WLAN communications module 230.

After the WLAN communications module 230 is woken up, at a time point 915, the WLAN communications module 230 starts to perform the WLAN data transmission with the access point 400 through the component carrier in the unlicensed spectrum of the WLAN access technology. At a time point 917, the LTE communications module 210 completes the LTE data transmission with the base station 300. The base station 300 may transmit the DRX command to the LTE communications module 210 when the LTE data transmission is completed, so as to control, according to the DRX command, the LTE communications module 210 to enter the dormant mode. Subsequently, the WLAN communications module 230 continues to perform the WLAN data transmission with the access point 400 until to the time point 919. At the time point 919, as shown in step S807 of FIG. 8, the access point 400 transmits the indication frame when the WLAN data transmission is completed, so as to control the WLAN communications module 230 of the mobile station 200 to enter the sleep mode.

Based on the above, the base station of the present disclosure may wake up the WLAN communications module of the mobile station through the RRC message or the MAC CE, and the access point of the present disclosure may send the indication frame, so as to control the WLAN communications module of the mobile station to enter the sleep mode. Through operations of network terminals such as the base station and the access point, when using the LWA technology, the mobile station of the present disclosure starts the WLAN communications module when the WLAN transmission is required, and turns off the WLAN communications module when there is no requirement for the WLAN transmission, so as to save the power consumption of the mobile station. In addition, the base station or the mobile station of the present disclosure may delay, on the basis of the transmission delay time between the base station and the access point, before starting the WLAN communications module of the mobile station. In this way, the mobile station may activate the WLAN communications module when the access point is ready for starting the transmission data through the WLAN, thereby avoiding unnecessary power consumption. Further, the base station of the present disclosure may transmit, through the DCI, a bit related to the LWA function, thereby facilitating the mobile station to determine whether to start the LWA function.

Although the present disclosure discloses the foregoing by using the embodiments, the foregoing is not intended to limit the present disclosure. Any person of ordinary skill in the art may make some variations and modifications without departing from the scope and spirit of the disclosure. Therefore, the protection scope of the present disclosure should fall within the scope defined by the appended claims below.

What is claimed is:

1. A method for saving power consumption of a mobile station, applicable to the mobile station, comprising:
   receiving control information from a base station through a control channel in a licensed spectrum via a first radio access technology;
   obtaining a control instruction from a corresponding resource block according to the control information, wherein when the base station and an access point employ a link manner of a non-ideal backhaul network, a time for receiving the control information differs from a time for receiving the control instruction by a first transmission delay time, wherein the first transmission delay time corresponds to a second transmission delay time between the base station and the access point;
   in response to receiving the control instruction through the first radio access technology, waking up, according to the control instruction, a communications module applying a second radio access technology by sending out a wake-up indication; and
   in response to receiving an indication frame through the second radio access technology from the access point, controlling the communications module to enter a sleep mode.

2. The method according to claim 1, wherein the control instruction is transmitted through a component carrier in the licensed spectrum of the first radio access technology, a first data transmission is performed with the base station through a component carrier in the licensed spectrum of the first radio access technology, and a second data transmission is performed with the access point through a component carrier in an unlicensed spectrum of the second radio access technology.

3. The method according to claim 2, wherein after the communications module is woken up to operate in an active mode, a trigger frame is transmitted to the access point through the second radio access technology, so as to trigger the access point to activate the second data transmission with the communications module.

4. The method according to claim 1, wherein the control instruction is configured in a media access control (MAC) control element (CE), and the control information comprises downlink control information (DCI).

5. The method according to claim 1, further comprising:
   in response to receiving the control instruction, entering a configuration period;
   receiving, during the configuration period, the control information through the control channel in the licensed spectrum of the first radio access technology; and
   in response to receiving the control information during the configuration period, sending out the wake-up indication to wake up the communications module.

6. The method according to claim 5, wherein when the base station and the access point employ the link manner of the non-ideal backhaul network, in response to receiving the control information by the mobile station, sending out the wake-up indication after a third transmission delay time.

7. The method according to claim 5, wherein the control instruction is configured in radio resource control (RRC) message of a RRC connection-reconfiguration, and the control information comprises downlink control information (DCI).

8. The method according to claim 7, wherein the DCI comprises a bit for indicating whether the mobile station uses the communications module to perform a second data transmission.

9. The method according to claim 7, further comprising:
   after entering the configuration period, terminating the configuration period in response to receiving another RRC message.

10. The method according to claim 5, wherein only while another communications module applying the first radio access technology sleeps, the communications module is controlled to enter the sleep mode in response to receiving the indication frame.

11. The method according to claim 1, further comprising:
    in response to receiving the control instruction, entering a configuration period; and
    periodically waking up, during the configuration period and according to the control instruction, the communications module applying the second radio access technology.

12. A mobile station, comprising:
    a first communications module, applying a first radio access technology; and
    a second communications module, applying a second radio access technology,
    wherein
    the first communication module receives control information from a base station through a control channel in a licensed spectrum via the first radio access technology;
    the first communication module obtains a control instruction from a corresponding resource block according to the control information, wherein when the base station and an access point employ a link manner of a non-ideal backhaul network, a time for the first communication module receiving the control information differs from a time for the first communication module receiving the control instruction by a first transmission delay time, wherein the first transmission delay time corresponds to a second transmission delay time between the base station and the access point;
    in response to receiving the control instruction by the first communications module, the first communications module wakes up the second communications module according to the control instruction by sending out a wake-up indication, and in response to receiving an indication frame by the second communications module from the access point, the second communications module entering a sleep mode.

13. The mobile station according to claim 12, wherein the control instruction is transmitted through a component carrier in the licensed spectrum of the first radio access technology, a first data transmission is performed with the base station through a component carrier in the licensed spectrum of the first radio access technology, and a second data transmission is performed with the access point through a component carrier in an unlicensed spectrum of the second radio access technology.

14. The mobile station according to claim 13, wherein after the second communications module is woken up to operate in an active mode, the second communications module transmits a trigger frame to the access point through the second radio access technology, so as to trigger the access point to activate the second data transmission with the second communications module.

15. The mobile station according to claim 12, wherein the control instruction is configured in a media access control (MAC) control element (CE), and the control information comprises downlink control information (DCI).

16. The mobile station according to claim 12, further comprising:

in response to receiving the control instruction by the first communications module, the first communications module enters a configuration period; the first communications module receives control information through the control channel in the licensed spectrum of the first radio access technology during the configuration period; and in response to obtaining the control information during the configuration period by the first communications module, the first communications module sends out the wake-up indication to wake up the second communications module.

17. The mobile station according to claim 16, wherein when a base station and an access point employ the link manner of the non-ideal backhaul network, in response to receiving the control information by the first communications module, the first communications module sends out the wake-up indication after a third transmission delay time.

18. The mobile station according to claim 16, wherein the control instruction is configured in radio resource control (RRC) message of RRC connection-reconfiguration, and the control information comprises downlink control information (DCI).

19. The mobile station according to claim 18, wherein the DCI comprises a bit for indicating whether the mobile station uses the second communications module to perform a second data transmission.

20. A method for saving power consumption of a mobile station, applicable to a base station applying a first radio access technology, comprising:

sending control information through a control channel in a licensed spectrum of the first radio access technology, so as to notify the mobile station to obtain a control instruction from a corresponding resource block according to the control information;

transmitting a control instruction to a mobile station through the corresponding resource block of the control information, so as to wake up, according to the control instruction, a communications module applying a second radio access technology of the mobile station, wherein when the base station and an access point employ a link manner of a non-ideal backhaul network, a time for sending the control information differs from a time for sending the control instruction by a first transmission delay time, wherein the first transmission delay time corresponds to a second transmission delay time between the base station and the access point; and in response to receiving indication information from the access point applying the second radio access technology, determining that the communications module of the mobile station enters a sleep mode.

21. The method according to claim 20, wherein the control instruction is configured in a media access control (MAC) control element (CE), and the control information comprises downlink control information (DCI).

22. The method according to claim 20, further comprising:

transmitting the control instruction to the mobile station, so as to control the mobile station to enter a configuration period; and sending, during the configuration period, the control information through the control channel in the licensed spectrum of the first radio access technology, so as to wake up the communications module of the mobile station.

23. The method according to claim 22, wherein when the base station and the access point employ the link manner of the non-ideal backhaul network, the base station transmits, according to the second transmission delay time between the base station and the access point, delay information to the mobile station through the control instruction, so as to delay a time for waking up the communications module.

24. The method according to claim 22, wherein the control instruction is configured in radio resource control (RRC) message of RRC connection-reconfiguration, and the control information comprises downlink control information (DCI).

25. The method according to claim 24, further comprising:

after the mobile station enters the configuration period, transmitting another RRC message to terminate the configuration period.

26. The method according to claim 24, wherein the DCI comprises a bit for indicating whether the mobile station uses the communications module to perform a data transmission.

27. A base station, applying a first radio access technology, comprising:

a transceiver having the first radio access technology, configured to transmit and receive a radio signal; and a controller, coupled to the transceiver, wherein the controller transmits control information through a control channel in a licensed spectrum of the first radio access technology, so as to notify a mobile station to obtain a control instruction from a corresponding resource block according to the control information;

wherein the controller transmits the control instruction to the mobile station through the corresponding resource block of the control information, so as to wake up, according to the control instruction, a communications module applying a second radio access technology of the mobile station, wherein when the base station and an access point employ a link manner of a non-ideal backhaul network, a time for sending the control information differs from a time for sending the control instruction by a first transmission delay time, wherein the first transmission delay time corresponds to a second transmission delay time between the base station and the access point, wherein the controller determines that the communications module of the mobile station enters a sleep mode in response to receiving indication information through the transceiver from the access point applying the second radio access technology.

28. The base station according to claim 27, wherein the control instruction is configured in a media access control (MAC) control element (CE), and the control information comprises downlink control information (DCI).

29. The base station according to claim 27, further comprising:

the controller transmits the control instruction to the mobile station, so as to control the mobile station to enter a configuration period; and the controller sending the control information during the configuration period through the control channel in the licensed spectrum of the first radio access technology, so as to wake up the communications module of the mobile station.

30. The base station according to claim 29, wherein when the base station and the access point employ the link manner of the non-ideal backhaul network, the base station transmits, according to the second transmission delay time between the base station and the access point, delay information to the mobile station through the control instruction, so as to delay a time for waking up the communications module.

31. The base station according to claim 29, wherein the control instruction is configured in radio resource control (RRC) message of RRC connection-reconfiguration, and the control information comprises downlink control information (DCI).

32. The base station according to claim 31, wherein after the mobile station enters the configuration period, the controller transmits another RRC message to terminate the configuration period.

* * * * *